(12) United States Patent
Tedeschi (10) Patent No.: US 8,556,556 B2
(45) Date of Patent: *Oct. 15, 2013

(54) SCREW WITH BREAKAWAY AND METHODS OF USING THE SAME

(75) Inventor: Nancy Kathryn Tedeschi, East Wenatchee, WA (US)

(73) Assignee: FBB Asset Management Limited Partnership, Daytona Beach, FL (US)

( * ) Notice: Subject to any disclaimer, the term of this patent is extended or adjusted under 35 U.S.C. 154(b) by 311 days.

This patent is subject to a terminal disclaimer.

(21) Appl. No.: 12/986,926

(22) Filed: Jan. 7, 2011

(65) Prior Publication Data

US 2011/0103915 A1 May 5, 2011

Related U.S. Application Data

(63) Continuation-in-part of application No. 12/187,254, filed on Aug. 6, 2008, now Pat. No. 8,070,403.

(60) Provisional application No. 61/293,170, filed on Jan. 7, 2010, provisional application No. 60/963,519, filed on Aug. 6, 2007, provisional application No. 60/993,726, filed on Sep. 14, 2007.

(51) Int. Cl.
*F16B 31/00* (2006.01)

(52) U.S. Cl.
USPC .................. 411/5; 411/2; 411/403; 411/411; 411/424

(58) Field of Classification Search
USPC .................................. 411/2, 5, 403, 411, 424
See application file for complete search history.

(56) References Cited

U.S. PATENT DOCUMENTS

| 869,443 | A | 10/1907 | Lund |
| 933,831 | A | 9/1909 | De Steiger |
| 1,039,576 | A | 9/1912 | Mueller et al. |
| 1,541,518 | A | 6/1925 | McCain |
| 1,662,834 | A | 3/1928 | Reiter |
| 1,970,071 | A | 8/1934 | Bengtsson |

(Continued)

FOREIGN PATENT DOCUMENTS

| EP | 1260 664 A1 | 11/2002 |
| JP | 52013853 B | 4/1977 |

(Continued)

OTHER PUBLICATIONS

Cameron & Barkley Company Catalog No. 26 (c) 1926 pp. 173, 187.

(Continued)

*Primary Examiner* — Roberta Delisle
(74) *Attorney, Agent, or Firm* — GFD Patents LLC; Gerald F. Dudding (57) ABSTRACT

A fastener with a breakaway and methods of using the same. In one embodiment the fastener is a screw having a head and elongated stem, adapted to be easily manipulated by a user when using the screw as a fastener in a hinge or joint. A means of holding a screw by providing a breakaway tab or non-threaded second portion of the elongated stem which can be used to align and insert the screw into a screw hole in the process of engaging threads in the screw hole with threads of the screw. After engaging the threads in the screw hole, such as after the screw has been essentially completely inserted into the screw hole, the breakaway tab or non-threaded second portion of the elongated stem of the screw may be broken off at a breakaway and discarded.

10 Claims, 11 Drawing Sheets

(56) References Cited

U.S. PATENT DOCUMENTS

| | | |
|---|---|---|
| 2,177,978 A | 10/1939 | Darvie |
| 2,230,984 A | 2/1941 | Chernow |
| 2,247,499 A | 7/1941 | Hutchison, Jr. |
| 2,382,019 A | 8/1945 | Miller |
| 2,408,559 A | 10/1946 | Keating |
| 2,542,340 A | 2/1951 | Mauraton |
| 2,552,265 A | 5/1951 | Edwards |
| 2,636,194 A | 4/1953 | Schneider |
| 3,208,328 A | 9/1965 | Myers |
| 3,307,444 A | 3/1967 | Money |
| 3,343,443 A | 9/1967 | Moore |
| 3,941,027 A | 3/1976 | Gibson et al. |
| 3,968,661 A | 7/1976 | Williams |
| 4,345,848 A | 8/1982 | Cheselka |
| 4,492,500 A | 1/1985 | Ewing |
| 4,659,267 A | 4/1987 | Uno et al. |
| 4,838,746 A | 6/1989 | Giannuzzi |
| 5,077,931 A | 1/1992 | Marshall |
| 5,161,234 A | 11/1992 | Nitta |
| 5,415,507 A | 5/1995 | Janusz et al. |
| 5,499,892 A | 3/1996 | Reed |
| 5,615,850 A | 4/1997 | Cloninger |
| 5,651,652 A | 7/1997 | Williams et al. |
| 5,675,988 A | 10/1997 | Ignatowski |
| 5,697,743 A | 12/1997 | Parker |
| 5,699,140 A | 12/1997 | Fuhrman |
| 5,746,096 A | 5/1998 | Lukes |
| 5,746,556 A | 5/1998 | Sato |
| 5,863,168 A | 1/1999 | Demarray |
| 5,893,538 A | 4/1999 | Onishi et al. |
| 5,896,184 A | 4/1999 | Lowe et al. |
| 5,906,029 A | 5/1999 | Fox |
| 5,928,236 A | 7/1999 | Augagneur et al. |
| 6,077,012 A | 6/2000 | Granese et al. |
| 6,152,737 A | 11/2000 | Beaty et al. |
| 6,454,768 B1 | 9/2002 | Jackson |
| 6,520,635 B1 | 2/2003 | Ignatowski |
| 6,793,208 B1 | 9/2004 | Riddle, Jr. et al. |
| 6,863,394 B1 | 3/2005 | Nelson et al. |
| 2001/0048860 A1 | 12/2001 | Ross et al. |
| 2006/0039772 A1 | 2/2006 | Matthys-Mark |
| 2007/0228743 A1 | 10/2007 | Kawano |

FOREIGN PATENT DOCUMENTS

| | | |
|---|---|---|
| JP | 57016012 U | 1/1982 |
| JP | 57164318 U | 10/1982 |
| JP | 59141324 U | 9/1984 |
| JP | 4-46420 U | 4/1992 |
| JP | 04101010 U | 9/1992 |
| JP | 07315159 A | 12/1995 |

OTHER PUBLICATIONS

Reexamination Control No. 90/012/157, U.S. Patent No. 8070403, Jul. 19, 2012.

255 — providing a screw, wherein a diameter of the proximal end of the breakaway is less than a diameter of the distal end of the breakaway, so that only the non-threaded second portion and the breakaway decouples from the non-threaded second portion when a user applies a torsional force by hand sufficient to decouple the threaded first portion from the non-threaded second portion, without the use of a tool;

↓

260 — inserting the threaded portion of the screw so that it engages a threaded channel of a hinge by a user manipulating the insertion using the non-threaded second portion;

↓

Go to step 265

Continued from Step 260

↓ aligning the threaded first portion of the screw with the threads of the hollow threaded channel of the hinge; — 265

↓ screwing the first threaded portion of the elongated stem into the hollow threaded channel of the hinge by rotating the threaded first portion of the screw that has been aligned with the threads of the hollow threaded channel of the hinge; and — 270

↓ cleanly decoupling the threaded first portion from the non-threaded second portion at the breakaway, so that the breakaway and the non-threaded second portion are essentially completely removed from the threaded first portion. — 275

Fig. 8B

SCREW WITH BREAKAWAY AND METHODS OF USING THE SAME

The present patent application is a continuation-in-part application claiming priority from provisional application Ser. No. 61/293,170 (filed Jan. 7, 2010 and titled "Screw With Breakaway and Methods of Using the Same") and non-provisional application Ser. No. 12/187,254 (filed Aug. 6, 2008 and titled "Screw With Breakaway and Methods of Using the Same"), which claims priority to provisional applications with Ser. No. 60/963,519 (filed Aug. 6, 2007 and titled "IBOB Specialize Screw") and 60/993,726 (filed Sep. 14, 2007 and titled "IBOB").

FIELD OF THE INVENTION

The present invention relates generally to fasteners. More specifically, the invention relates to screws and their use in joints.

BACKGROUND

Small, hand held fastening devices are used in the mechanical and construction industries.

There is an increasing need for adaptations that facilitate the manipulation of such small, hand held fastening devices.

SUMMARY OF THE INVENTION

A first aspect of the present invention provides A screw, comprising: a screw head; and an elongated stem, comprising: a threaded first portion and a non-threaded second portion extending from the distal end of the threaded first portion and a breakaway therebetween, wherein a proximal end of the breakaway is co-extensive with a distal end of the threaded first portion and a distal end of the breakaway is co-extensive with a proximal end of the non-threaded second portion, wherein a diameter of the proximal end of the breakaway is less than a diameter of the distal end of the breakaway, so that the non-threaded second portion and the breakaway decouples cleanly from the threaded first portion when a user applies a torsional or out-of-plane bending force by hand sufficient to decouple the threaded first portion from the non-threaded second portion, without the use of a tool.

A second aspect of the present invention provides a method of using a screw, comprising: providing the screw of claim 1; inserting the threaded portion of the screw so that it engages a threaded channel of a hinge by a user manipulating the insertion using the non-threaded second portion; aligning the threaded first portion of the screw with the threads of the hollow threaded channel of the hinge; screwing the first threaded portion of the elongated stem into the hollow threaded channel of the hinge by rotating the threaded first portion of the screw that has been aligned with the threads of the hollow threaded channel of the hinge; and cleanly decoupling the threaded first portion from the non-threaded second portion at the breakaway, so that the breakaway and the non-threaded second portion are essentially completely removed from the threaded first portion.

DETAILED DESCRIPTION OF EMBODIMENTS OF THE INVENTION

Figure 1A:
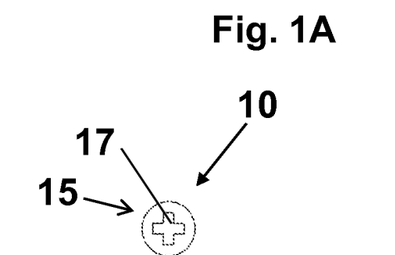
FIG. 1A depicts a top plan view of a first surface of a screw head of a screw, in accordance with embodiments of the present invention.

FIG. 1A depicts a top plan view of a first surface 19 of a screw head 15 of a screw 10. The screw head 15 includes a driver slot 17. The screw 10 may be a round head 15 made of stainless steel, brass, nickel/sliver, carbon steel, titanium, or other appropriate metals or metal alloys. The driver slot 17 may be a single groove, a Phillips® cross shaped groove, an hexagonal groove for turning with a hex wrench.

Figure 1B:
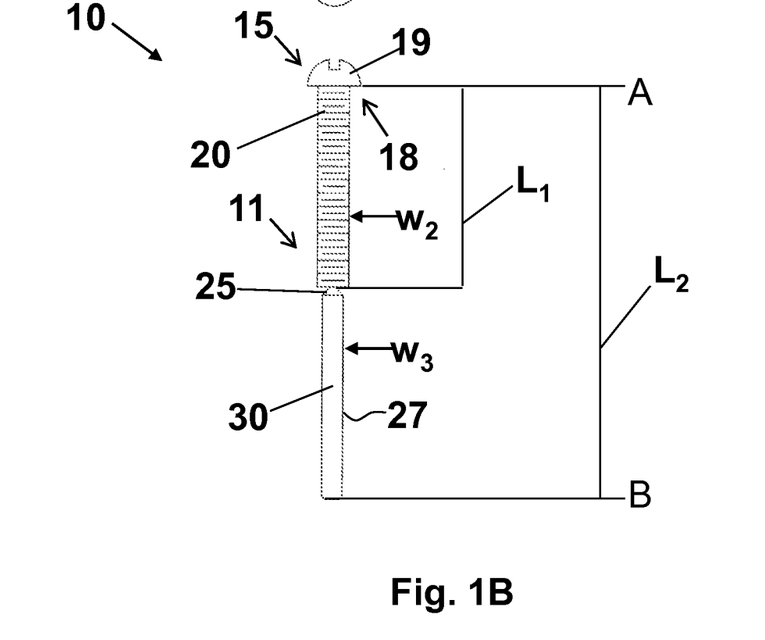
FIG. 1B depicts a longitudinal cross-sectional view of the screw depicted in FIG. 1A, in accordance with embodiments of the present invention.

FIG. 1B depicts a longitudinal cross-sectional view of the screw 10. The screw 10, comprises: the screw head 15, comprising: a first surface 19 having a driver slot 17 thereon, and a second surface 18, wherein the second surface 18 of the screw head 15 faces away from the first surface 19. The screw 10 comprises an elongated stem 11. The elongated stem 11 comprises a threaded first portion 20. A proximal end A of the threaded first portion 20 is mechanically and physically coupled to the second surface 18 of the screw head 15. The mechanical and physical coupling between the second surface 18 of the screw head 15 and the proximal end A of the threaded first portion 20 is not a breakaway 25, 43. The elongated stem 11 comprises a non-threaded second portion 30 extending from a distal end C of the threaded first portion 20; and a breakaway 25 therebetween.

Hereinafter, a "breakaway" is defined as a releasable coupling between a removable piece such as the proximal end 12 of the non-threaded second portion 30 and the distal end C of the threaded first portion 20. Hereinafter, "distal end" is defined as the further point along the elongated stem 11 in reference to the second surface 18 of the screw head 15, and "proximal" is defined as the nearer point along the elongated stem 11 in reference to the second surface 18 of the screw head 15.

Hereinafter "releasably coupling" is defined as forming or breaking or cleaving or severing a mechanical and physical coupling between the removable piece such as the proximal end 12 of the non-threaded second portion 30 and the distal end C of the threaded first portion 20.

Hereinafter "screwing the screw 10, 13 into a screw hole 59, 100 or threaded hollow threaded channel 64 of a hinge 66" is defined as engaging the threads 63 in the screw hole 59, 100 or hollow threaded channel 64 of a hinge 66, by rotating the screw 10, 13 about its longitudinal axis in a clockwise motion, resulting in the screw 10, 13 being essentially completely inserted into the screw hole 59, 100 or hollow threaded channel 64 of the hinge 66. Such engaging the threads 63 in the screw hole or hollow threaded channel 64 has the ultimate end that the screw 10, 13 has been essentially completely inserted into the screw hole 59, 100.

In one embodiment, the screw 10 comprises a non-threaded second portion 30 for making it easier to handle the screw 10. You insert the non-threaded second portion 30 of the screw 10 into a screw hole 100 first and then you are able to pull the threaded first portion 20 of the screw 10 into the screw hole 100 as the non-threaded second portion 30 is removed from the screw hole 100. This adapts the screw 10 to be more easily manipulated by hand by a user.

In one embodiment, a length $L_1$ from about 0.3375 in. to about 0.4125 in. may separate the proximal end A of the threaded first portion 20 and the distal end C of the threaded first portion 20.

In one embodiment, a length $L_2$ from about 0.6973 in. to about 0.8525 in. may separate the proximal end A of the threaded first portion 20 and the distal end B of the non-threaded second portion 30 of the elongated stem 11.

In one embodiment, a diameter $W_3$ of the non-threaded second portion 30 is preferably smaller than a diameter $W_2$ of the threaded first portion 20 of the elongated stem 11. In one embodiment the diameter $W_3$ is from about 0.036 in. to about 0.044 in.

In one embodiment an axial cross-section of the non-threaded second portion 30 is substantially circular. In this embodiment, an outer surface 27 of the non-threaded second portion 30 is substantially smooth.

Figures 2A, 3A:
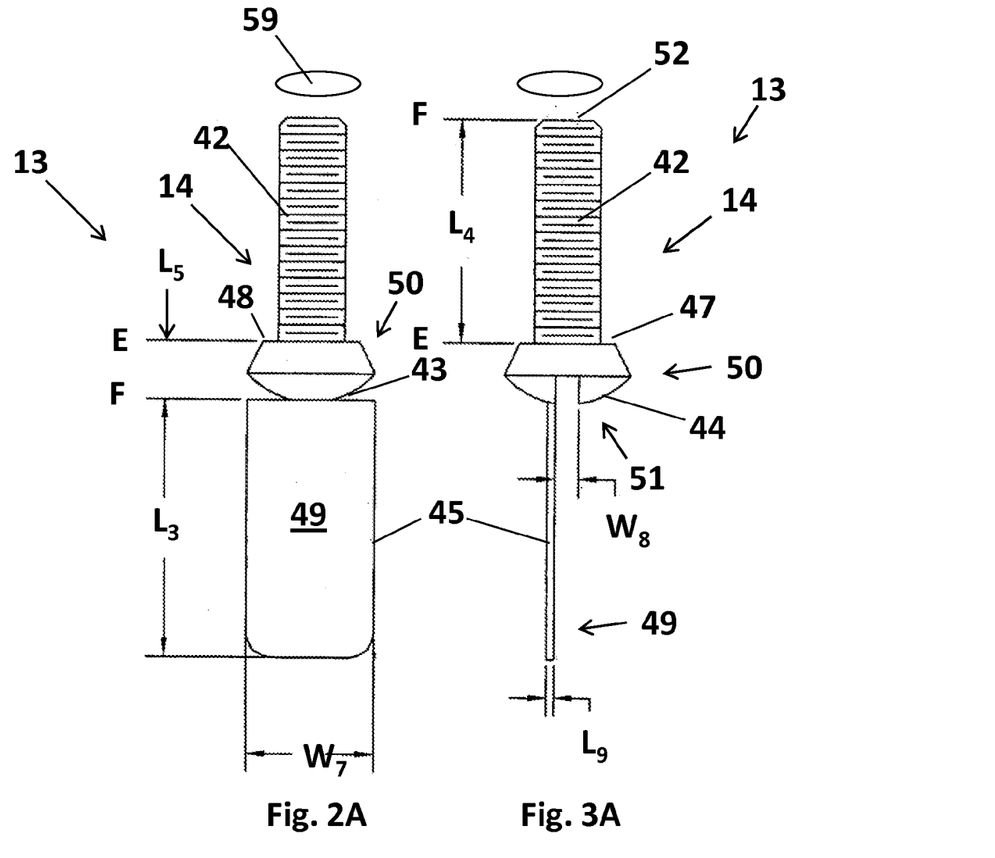
FIG. 2A depicts a front longitudinal view of a screw, in accordance with embodiments of the present invention.
FIG. 3A depicts a side elevation view of the screw the screw depicted in FIGS. 2A and 2B, in accordance with embodiments of the present invention.

FIG. 2A depicts a front longitudinal view of a screw 13. The screw 13 comprises: a screw head 50 and an elongated stem 14. The screw head 50, comprises: a first surface 44 having a driver slot 51 thereon. The screw head 50, comprises a second surface 48, depicted in FIG. 3A and described in associated text. The second surface 48 of the screw head 50 faces away from the first surface 44. The elongated stem 14, comprises: either a threaded first portion 20 and a non-threaded second portion 30 extending from the distal end C of the threaded first portion 20 and a first breakaway 25 therebetween, depicted in FIG. 1B, or a threaded first portion 42, without the non-threaded second portion 30, depicted in FIG. 1B, extending from the threaded first portion 42 and a second breakaway 43. A proximal end E of the threaded first portion 42 is non-releasably coupled to the second surface 48 of the screw head 50. The mechanical and physical coupling between the second surface 48 of the screw head 50 and the proximal end E of the threaded first portion 42 is not a breakaway 25, 43. In this embodiment, the first breakaway 25 releasably couples the non-threaded second portion 30 to the distal end C of the threaded first portion 20. In an alternative embodiment the threaded first portion 42, without the non-threaded second portion 30 extends from the threaded first portion 42 and a second breakaway 43. In this embodiment, a proximal end E of the threaded first portion 42 is non-releasably mechanically and physically coupled to the second surface 48 of the screw head 50. In this embodiment, the mechanical and physical coupling between the second surface 48 of the screw head 50 and the proximal end E of the threaded first portion 42 is not a breakaway 25, 43. In addition, the second breakaway 43 releasably couples the first surface 48 of the screw head 50 to a breakaway tab 45.

In one embodiment, a screw 13 with a breakaway tab 45 on the screw head 50 guides screws 13 into a screw hole 59 for easy maneuverability. Any size screw 13, or breakaway tab 45 may be placed anywhere on the head 50 of the screw 13. Insert the screw 13 in hole 59, turn the breakaway tab 45 to start the screwing operation and then break the breakaway tab 45 off.

In one embodiment, a length $L_5$ from the second surface 48 to the second breakaway 43, releasably coupling the breakaway tab 45, may be from about 0.1 in. to about 0.21 in.

In one embodiment, a width $W_7$ of the breakaway tab 45 may be from about 0.225 in. to about 0.275 in. and a length $L_3$ of the breakaway tab 45 may be from about 0.45 in. to about 0.55 in.

Figures 2B, 3B:
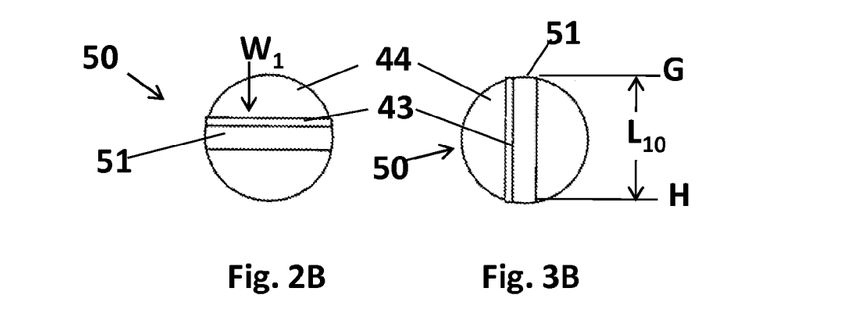
FIG. 2B depicts a top plan view of a first surface of a screw head of the screw depicted in FIG. 2A, in accordance with embodiments of the present invention.
FIG. 3B depicts a top plan view of a first surface of a screw head of the screw depicted in FIGS. 2A, 2B, and 3A, in accordance with embodiments of the present invention.

FIG. 2B depicts a top plan view of a first surface 44 of a screw head 50 of the screw 13. The screw head 50 includes a driver slot 51. The screw 13 may be made of stainless steel, brass, nickel/sliver, carbon steel, titanium, or other appropriate metals or metal alloys. The driver slot 51 may be a single groove, a Phillips® cross shaped groove, or an hexagonal groove for turning with a hex wrench.

FIG. 3A depicts a side elevation view of the screw 13. In one embodiment, a length $L_4$ from the proximal end E of the threaded first portion 20 to the distal end F of the threaded first portion 42 of the elongated stem 14 may be from about 0.3942 in. to about 0.4818 in.

In one embodiment, a face 49 of the breakaway tab 45 and a longitudinal plane of the driver slot 51 are parallel. A width $W_8$ of the driver slot 51 may be from about 0.045 in. to about 0.055 in. A ratio of the thickness $L_9$ of the breakaway tab 45 of the screw 13 to the width $W_8$ of the driver slot 51 is from about 0.3:1.0 to about 0.4:0.9.

In one embodiment, a ratio of the length $L_1$ of the threaded first portion 20 to a length of the non-threaded second portion 30 of the screw 10 is from about 1:1 to about 0.775:1. The length of the non-threaded second portion is defined as a length between proximal end 12 of the non-threaded second portion 30 and the distal end B of the non-threaded second portion 30 of the elongated stem 11, as depicted in FIGS. 1B and 4, and described in associated text, herein.

In one embodiment, a diameter of the first breakaway 25 of the screw 10 is less than or equal to 0.015 in., when the diameter of the elongated stem 11 is essentially equal to 0.040 in.

In one embodiment, a ratio of the width $W_1$ of the breakaway tab 45 to a length $L_3$ of the breakaway tab 45 is from about 1:2 to about 1:10.

In one embodiment, the screw head 50 is a slotted undercut oval countersunk head.

In one embodiment, the threaded first portion 42 has a 6-32 UNF thread, wherein conventional UNC or UNF thread is a 60 degree thread.

In one embodiment, a ratio of the length $L_4$ of the threaded first portion 42 to the length $L_3$ of the breakaway tab 45 of the screw 10 is from about 1:1 to about 0.876:1.

FIG. 3B depicts a top plan view of a first surface 44 of a screw head 51 of the screw 50. In one embodiment, a width $W_1$ of the second breakaway 43 across the first surface 44 of the screw head 50, depicted in FIG. 2B, is from about 75% to about 95% of the length $L_{10}$ of the driver slot 51 thereon.

Figure 4A:
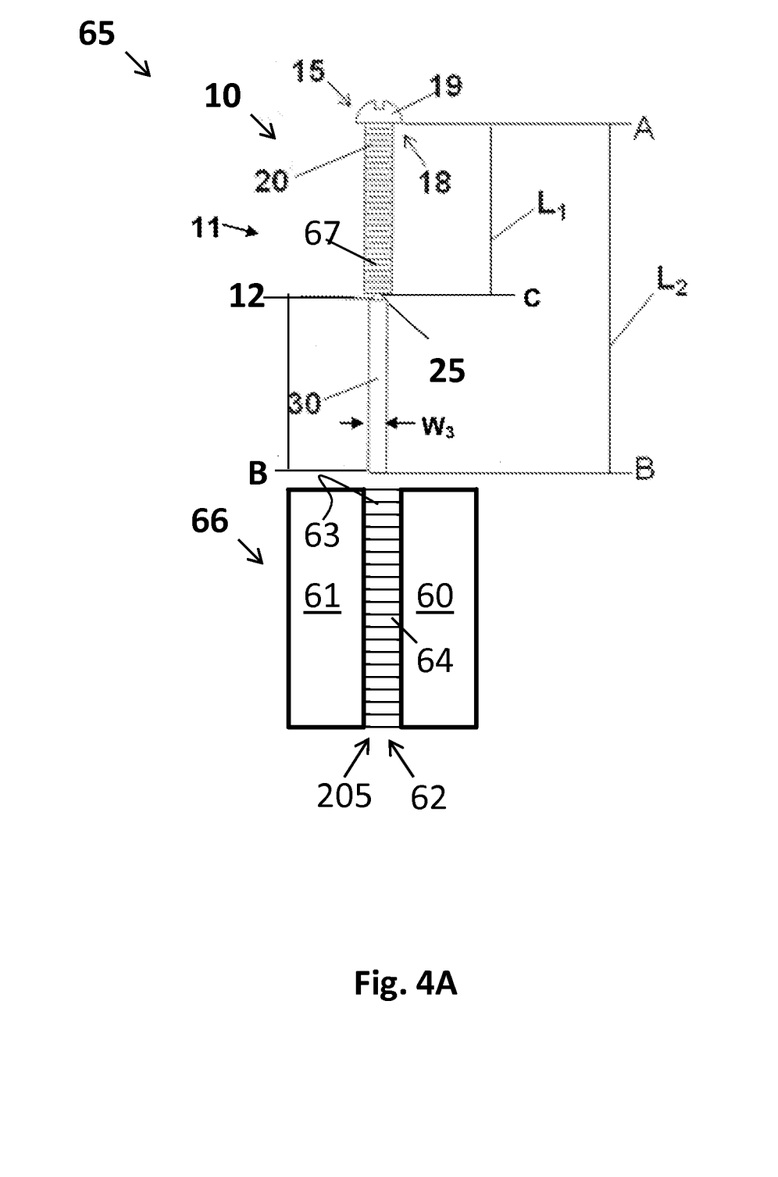
FIGS. 4A and 4B depict a longitudinal cross-sectional view of a kit, in accordance with embodiments of the present invention.

FIG. 4A depicts a longitudinal cross-sectional view of a kit 65. In one embodiment, the kit 65 comprises: a hinge 66, comprising first and second straps 60, 61, pivotably coupled to a cylinder 62. The cylinder 62 has a hollow threaded channel 64 therein. The kit 65 comprises: a screw 10, comprising: a head 19 and an elongated stem 11. The elongated stem 11, comprises: either a threaded first portion 20 adjacent to the head 15 and a non-threaded second portion 30 extending from the threaded first portion 20 and a first breakaway 25 therebetween. The first breakaway 25 releasably couples the threaded first portion 20 of the elongated stem 11 to the non-threaded second portion 30 of the elongated stem 11. The non-threaded second portion 30 of the elongated stem 11 has been aligned with the hollow threaded channel 64 in the hinge 66. The non-threaded second portion 30 of the elongated stem 11 has been inserted into the hollow threaded channel 64 in the hinge 66 so that the threaded first portion 20 of the elongated stem 11 catches at least one of the threads 63 of the hollow threaded channel 64 of the hinge 66.

Alternatively, the kit 65 comprises; a screw 13, depicted in FIGS. 2A, 2B, and FIGS. 3A, 3B. The screw 13 comprises: a screw head 50 and an elongated stem 14.

The elongated stem 14 comprises a threaded first portion 42 physically and mechanically non-releasably coupled to the second surface 48 of the screw head 50 without the non-threaded second portion 30, depicted in FIGS. 1A, B extending from the threaded first portion 42 and a second breakaway 43. The second breakaway 43 releasably couples the first surface 44 of the screw head 50 to a breakaway tab 45. The threaded first portion 42 of the elongated stem 11 has caught at least one thread 63 of the hollow threaded channel 64 of the hinge 66, by threading the threads 67 of the threaded first portion 20 of the elongated stem 11 with the threads 63 of the hollow threaded channel 64.

In all preferred embodiments, the proximal end E of the threaded first portion 42 and the second surface 48 of the screw head 50 are mechanically and physically non-releasably coupled.

In one embodiment, the breakaway tab 45 extends along a longitudinal axis of the screw 13, away from the first surface 44 of the screw head 50.

Figure 5:
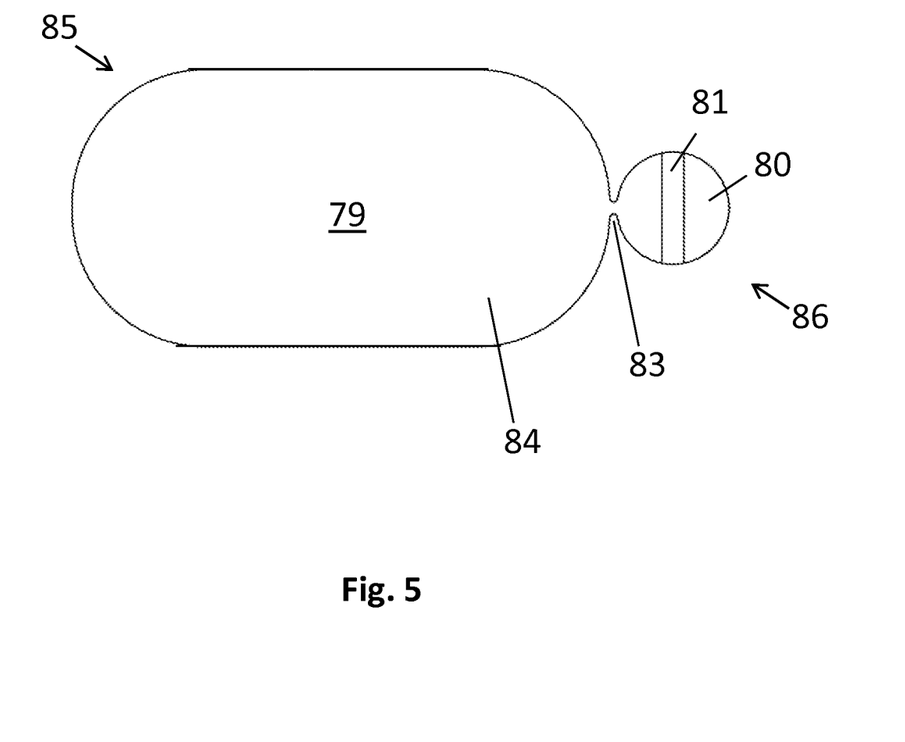
FIG. 5 depicts a top plan view of a screw having a screw head, in accordance with embodiments of the present invention.

FIG. 5 depicts a top plan view of a screw 85 having a screw head 86. The screw head 86 has a first surface 80 and a driver slot 81, therein. The screw head 86 is releasably coupled to a breakaway tab 84, having a breakaway 83 therebetween. The breakaway tab 84 has a first surface 79, and the first surface 79 may be coplanar with the first surface 80 of the screw head 86.

Figure 6A:
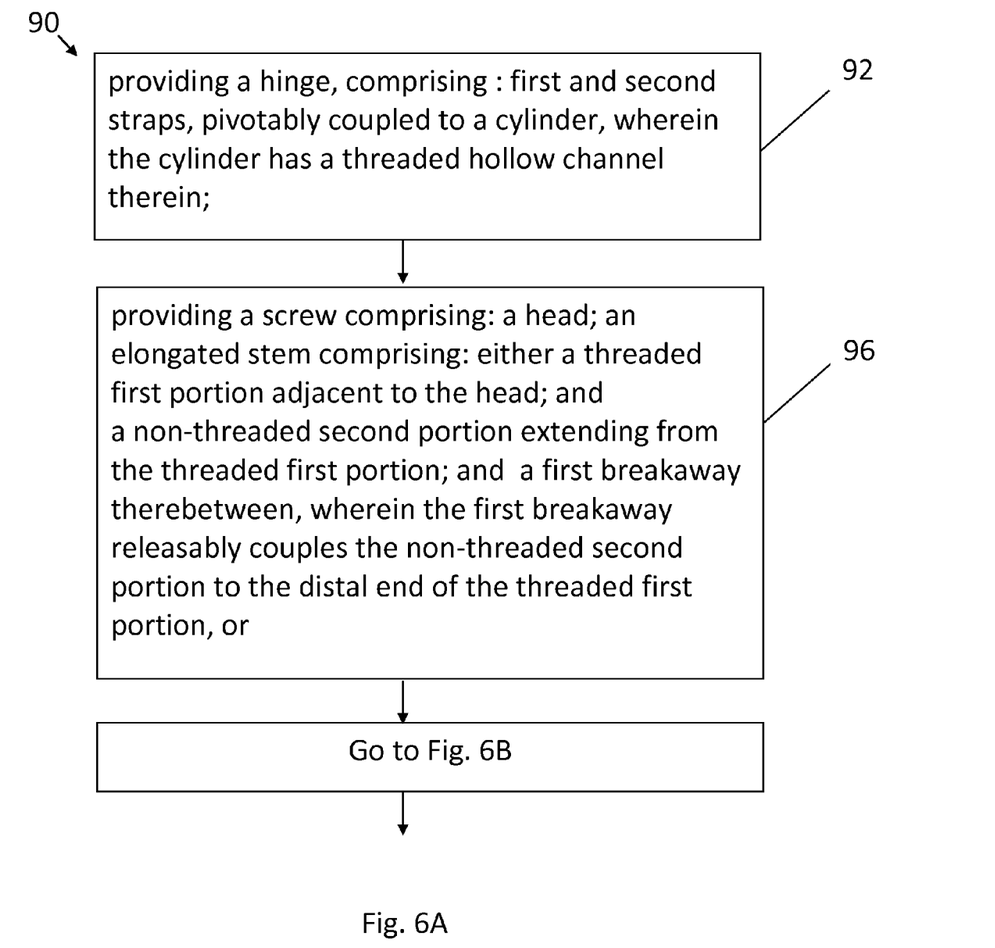
FIGS. 6A-6C depict a flow diagram of a method of replacing a screw in a hinge of the kit, depicted in FIGS. 4A, 4B, in accordance with embodiments of the present invention.
Figure 6B:
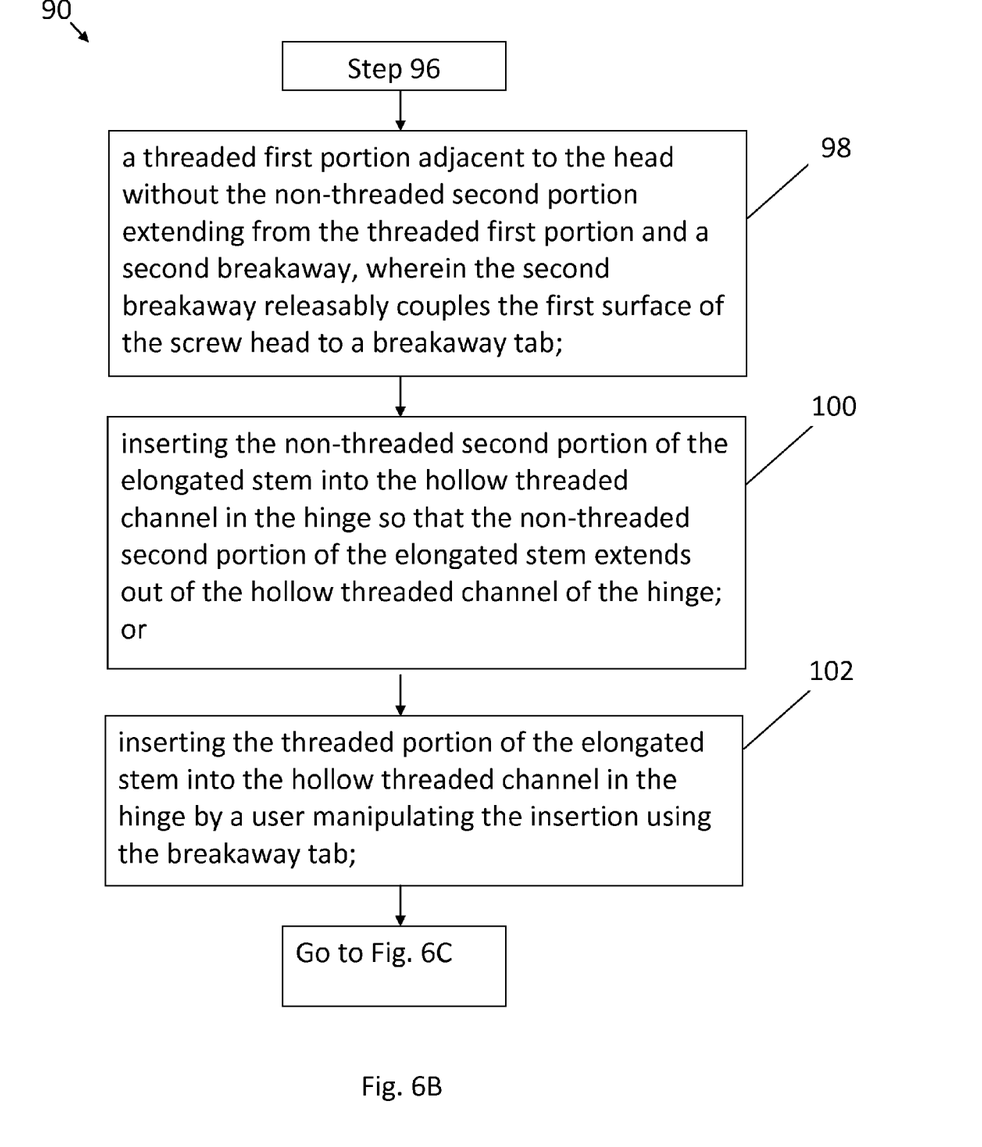
Figure 6C:
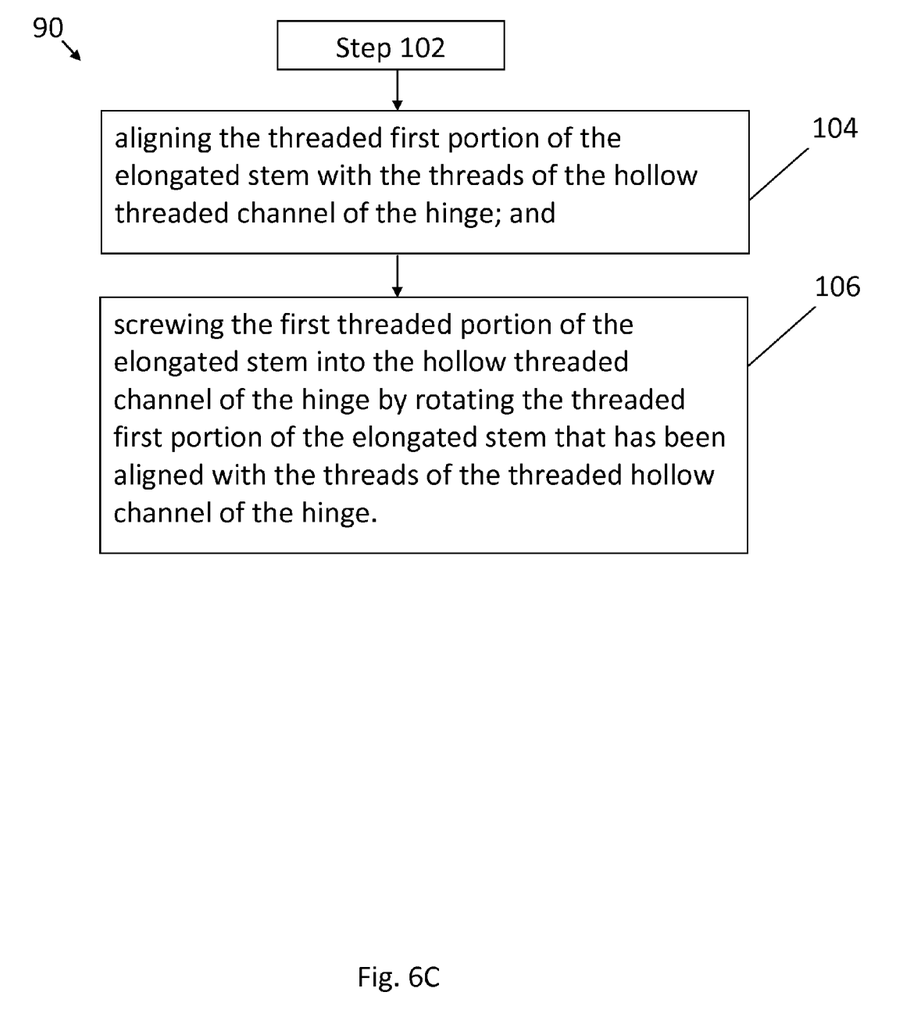

FIGS. 6A-6C depict a flow diagram of a method 90 of replacing a screw 10, 13 in a hinge 66, depicted in FIG. 4A, and described in associated text and depicted in FIGS. 2A.-3B, and described in associated text. In a step 92 of the method 90, a hinge 66 is provided. In the step 92 of providing the hinge 66, first and second straps 60, 61 may be pivotably coupled to a cylinder 62. The cylinder 62 has a hollow threaded channel 64 therein.

In a steps 96 and 98 a screw 10, 13 is provided. The screw 10, 13 comprises: a head 15, 50; an elongated stem 11,14. In the steps 96, 98 the elongated stem 11, 14 comprises: either a threaded first portion 20, 42 adjacent to the head 15, 50; and a non-threaded second portion 30, extending from the threaded first portion 20, 42; and a first breakaway 25 therebetween, wherein the first breakaway 25 releasably couples the non-threaded second portion 30 to the distal end C of the threaded first portion 20, or a threaded first portion 42 adjacent to the head 50 without the non-threaded second portion 30 extending from the threaded first portion 42 and a second breakaway 43, wherein the second breakaway 43 releasably couples the first surface 44 of the screw head 50 to a breakaway tab 45. In a step 100 of the method 90, the non-threaded second portion 30 of the elongated stem 11 may be inserted into the hollow threaded channel 64 in the hinge 66 so that the non-threaded second portion 30 of the elongated stem 11 extends out of the hollow threaded channel 64 of the hinge 66.

Alternatively, in the step 102 of the method 90, the threaded first portion 42 of the elongated stem 14 may be inserted into the hollow threaded channel 64 in the hinge 66 by a user manipulating the insertion using the breakaway tab 45.

In a step 104 of the method 90, the threaded first portion 20, 42 of the elongated stem 11, 14 may be aligned with the threads 63 of the hollow threaded channel 64 of the hinge 66.

In a step 106 of the method 90, the first threaded portion 20, 42 of the elongated stem 11, 14 may be screwed into the hollow threaded channel 64 of the hinge 66 by rotating the threaded first portion 20, 42 of the elongated stem 11, 14 that has been aligned with the threads 63 of the threaded hollow channel 64 of the hinge 66.

In one embodiment of the step 102 of the method 90, the breakaway tab 45 extends along a longitudinal axis of the screw 13, away from the first surface 44 of the screw head 50.

In one embodiment of the step 102 of the method 90, a first surface 79 of the breakaway tab 84 and a first surface 80 of the screw head 86 are coplanar, depicted in FIG. 5, and described in associated text.

In one embodiment of the step 106 of the method 90, a user may turn the breakaway tab 45 about its longitudinal axis to rotate the screw 13, wherein the breakaway tab 45 is releasably coupled to the first surface 44 of the screw head 50 by the second breakaway 43.

In one embodiment of the step 106 of the method 90, the breakaway tab 45, 84 is broken off from the first surface 44 of the screw head 50 at the second breakaway 43, or at the second breakaway 83, after the threaded first portion 42 of the elongated stem 14 catches at least one thread 63 of the threaded hollow channel 64 of the hinge 66.

In one embodiment of the step 106 of the method 90, the non-threaded second portion 30 of the elongated stem 11 is broken off at the first breakaway 25 from the threaded first portion 20 of the elongated stem 11 after the threaded first portion 20 of the elongated stem is essentially completely screwed into the threaded hollow channel 64 of the hinge 66.

In one embodiment of the step 102 of the method 90, inserting the non-threaded second portion 30 of the elongated stem 11 into the hollow threaded channel 64 in the hinge 66 so that the non-threaded second portion 30 of the elongated stem 11 extends out of the hollow threaded channel 64 of the hinge 66, by a user pulling the non-threaded second portion 30 of the elongated stem 11.

In one embodiment of the step 106 of the method 90, a user removes the non-threaded second portion 30 from the elongated stem 11 of the screw 10 after catching at least one thread 63 of the hollow threaded channel 64 of the hinge 66.

In one embodiment of the step 106 of the method 90, the breakaway tab 45 extends along a longitudinal axis of the screw 13, away from the first surface 44 of the screw head 50 when the breakaway tab 45 is broken off from the first surface 44 of the screw head 50 at the second breakaway 43, after the threaded first portion 42 of the elongated stem 14 catches at least one thread 63 of the threaded hollow channel 64 of the hinge 66.

Figure 4B:
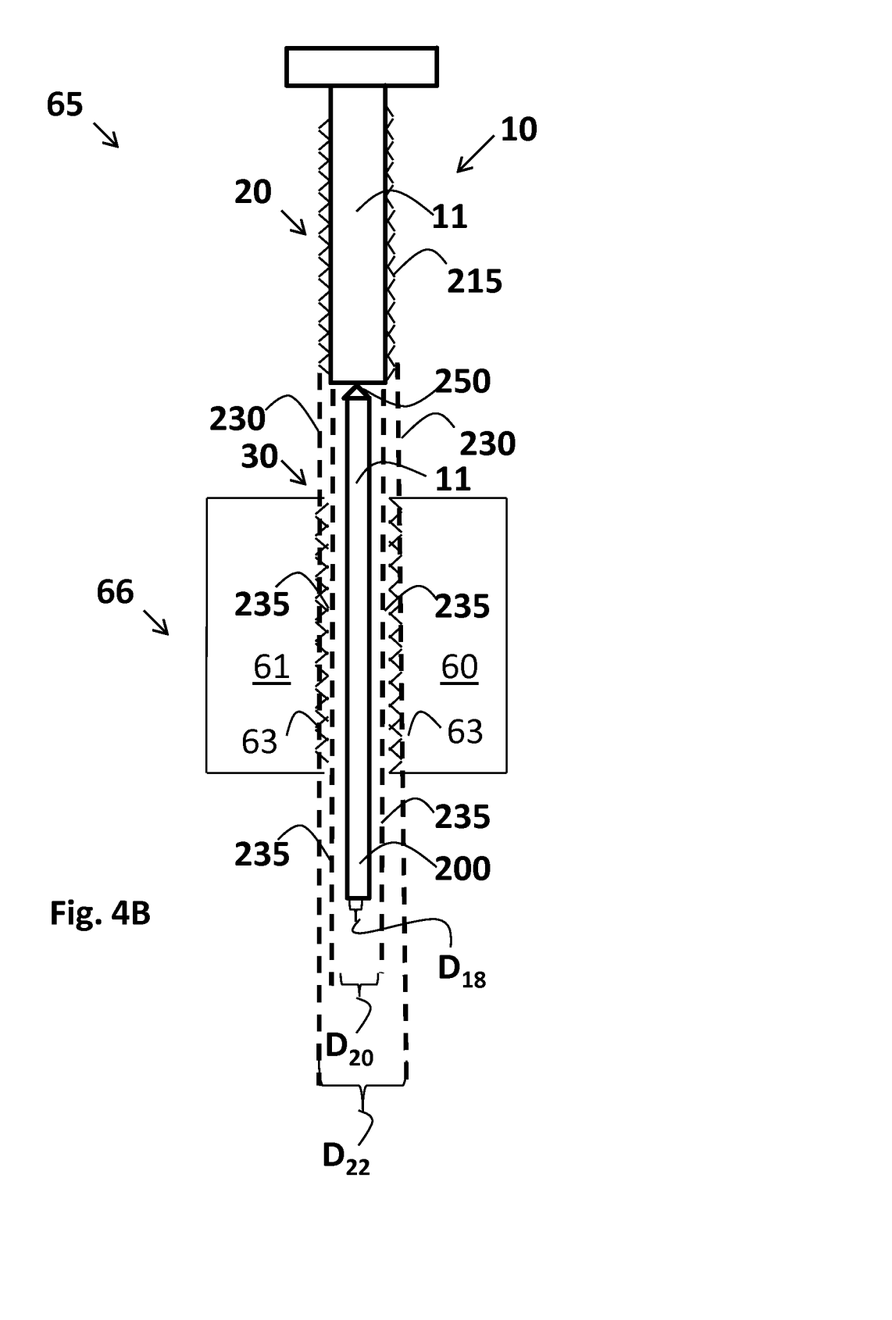

FIG. 4B depicts a longitudinal cross-sectional view of the kit 65, depicted in FIG. 4A, or the screw 10, depicted in FIG. 1B, after the non-threaded second portion 30 of the screw 10 has been inserted into the hollow threaded channel 64 of the hinge 66 or the screw hole 100. You insert the non-threaded second portion 30 of the screw 10 into a screw hole 100 first and then you are able to pull the threaded first portion 20 of the screw 10 into the screw hole 100 as the non-threaded second portion 30 is removed from the screw hole 100. This adapts the screw 10 to be more easily manipulated by hand by a user without the use of a tool.

In this embodiment, a portion 200 of the non-threaded second portion 30 of the screw 10 extends out of the opening 205 of the cylinder 62 or screw hole 100. A user is able to pull the threaded first portion 20 of the screw 10 into the screw hole 100 as the non-threaded second portion 30 is removed from the screw hole 100. This adapts the screw 10 to be more easily manipulated by hand, by a user, without the use of a tool.

In this embodiment, the screw 10 comprises a breakaway 250 between the distal end C of the threaded first portion 20 and the proximal end 12 of the non-threaded second portion 30 of the elongated stem 11. The breakaway 250 may have a pyramidal shape, comprising a base and an apex, in which the base has a wider diameter than the diameter of the apex. The base of the breakaway 250 and the proximal end 12 of the non-threaded second portion 30 of the elongated stem 11 of the screw 10 are co-extensive. The apex of the breakaway 250 and the distal end C of the threaded first portion 20 of the elongated stem 11 of the screw 10 are also co-extensive. A characteristic of the breakaway 250 is that a diameter of the proximal end of the breakaway 250 that is co-extensive with the distal end C of the threaded first portion 20 of the elongated stem 11 is smaller than a diameter of the of the distal end of the breakaway 250 that is co-extensive with the proximal end 12 of the non-threaded second portion 30 of the elongated stem 11 of the screw 10.

Figure 7:
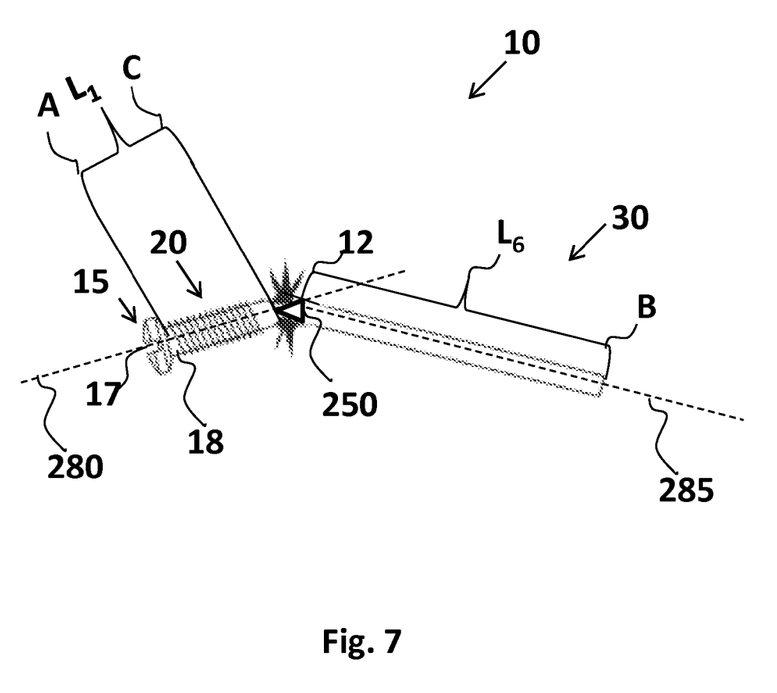
FIG. 7 depicts a front elevation view of a releasably coupled threaded first and non-threaded second portion, and a breakaway, therebetween, in accordance with embodiments of the present invention.

In this embodiment, a diameter of the proximal end of the breakaway 250 is less than a diameter of the distal end of the breakaway 250, so that the non-threaded second portion 30 and the breakaway 250 decouples from the threaded portion 20, cleanly, without any of the breakaway 250 remaining on the distal end C of the threaded first portion 20, when a user applies a torsional or out-of-plane 280, 285 bending force by hand sufficient to decouple the threaded first portion from the non-threaded second portion, without the use of a tool, as depicted in FIG. 7 and described in associated text.

In one embodiment, the diameter of the base of the breakaway 250 may be advantageously less than or equal to 0.55 mm +/− 25%.

In this embodiment, a clean break may result from decoupling the threaded first portion 20 from the non-threaded second portion 30 at the apex of the breakaway 250, so that the breakaway 250 and the non-threaded second portion 30 are essentially completely removed from the distal end C of the threaded first portion 20.

The length $D_{22}$ between opposite points on parallel lines 230 is defined as the outer diameter of the threaded first portion 20 of the elongated stem 11 of the screw 10 and includes the contribution of the threads 215 to the outer diameter. The length $D_{200}$ between opposite points on parallel lines 235 is defined as the inner diameter of the threaded first portion 20 of the elongated stem 11 of the screw 10 and does not include the contribution of the threads 215 to the inner diameter. Hereinafter, the diameter of the non-threaded second portion 30 of the elongated stem 11 of the non-threaded second portion 30 is defined $D_{218}$.

In one embodiment, a diameter $D_{218}$ of the elongated stem 11 of the non-threaded second portion 30 is preferably smaller than a diameter $D_{200}$ of the threaded first portion 20 of the elongated stem 11. In one embodiment, the diameter $D_{218}$ is from about 0.036 in. to about 0.044 in.

FIG. 7 depicts a front elevation view of a releasably coupled threaded first portion 20 of the elongated stem 11 of the screw 10 and non-threaded second portion 30 of the elongated stem 11 of the screw 10, and a breakaway 250, therebetween. The non-threaded second portion 30 has a unique feeder length $L_4$ making handling and working with screw 10 a pleasure. The non-threaded second portion 30 may break off cleanly by hand—no cutting or filing! The releasably coupled threaded first portion 20 of the elongated stem 11 of the screw 10 and non-threaded second portion 30 of the elongated stem 11 of the screw 10, having a breakaway 250, therebetween, may reduce the frequency of dropped screws, and more importantly, may save on repair time.

The releasably coupled threaded first portion 20 of the elongated stem 11 of the screw 10 and non-threaded second portion 30 of the elongated stem 11 of the screw 10, and a breakaway 250, therebetween may be made with a complete variety of stainless steel models with:

Smaller heads;
Multiple thread sizes and lengths; and
a Stay-Tight Thread™ lock.

In one embodiment, a ratio of the length $L_1$ of the threaded first portion 20 to the non-threaded second portion 30 is from about 1:3.33 to about 1:2.1, so that a user may apply a torsional or out-of-plane 280, 285 bending force by hand sufficient to cleanly decouple the threaded first portion 20 from the non-threaded second portion 30 at the apex of the breakaway 250, without the use of a cutting tool or pliers or any device that would give the user a mechanical advantage.

Hereinafter "torsional force" is defined as the stress or deformation caused when one end of an object is twisted in one direction and the other end is held motionless or twisted in the opposite direction. Hereinafter "out of plane bending force" is defined as stress or deformation caused when one end of an object is bent out of the plane of the other end.

In one embodiment, a material of construction of the releasably coupled threaded first portion 20 of the elongated stem 11 of the screw 10 and non-threaded second portion 30 of the elongated stem 11 of the screw 10, and a breakaway 250, therebetween may be selected from the group consisting of plastic, metal, and metal alloys.

In one embodiment, the plastic is selected from the group consisting of polyvinylchloride, high or low density polyethylene, high or low density polypropylene, polyetherimide, and EPDM (ethylene propylene diene terpolymer).

In one embodiment, the metal is selected from the group consisting of nickel, brass, stainless steel and titanium.

Figure 8A:
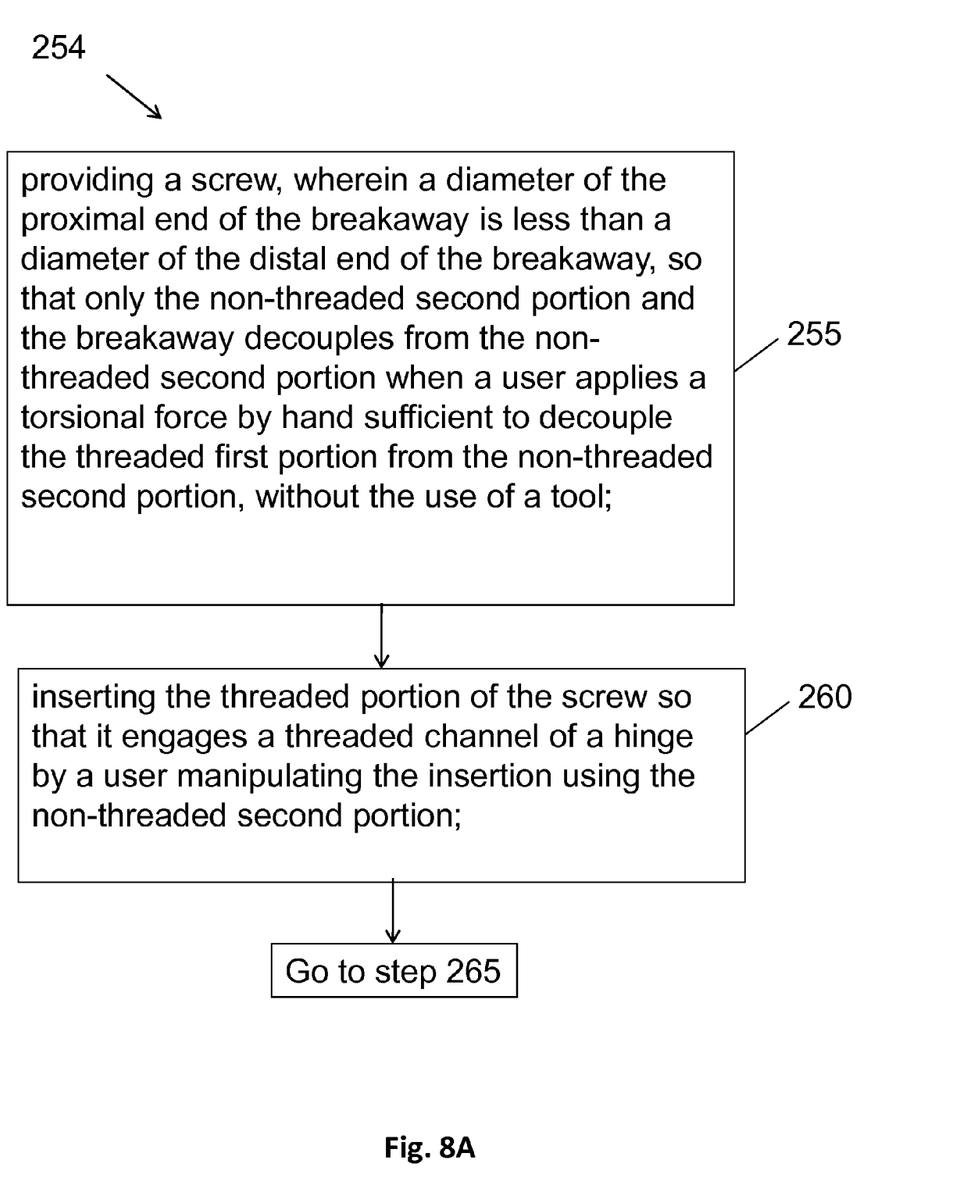
FIGS. 8A-8B depict a flow diagram of a method of using the screw depicted in FIG. 7, in accordance with embodiments of the present invention.
Figure 8B:
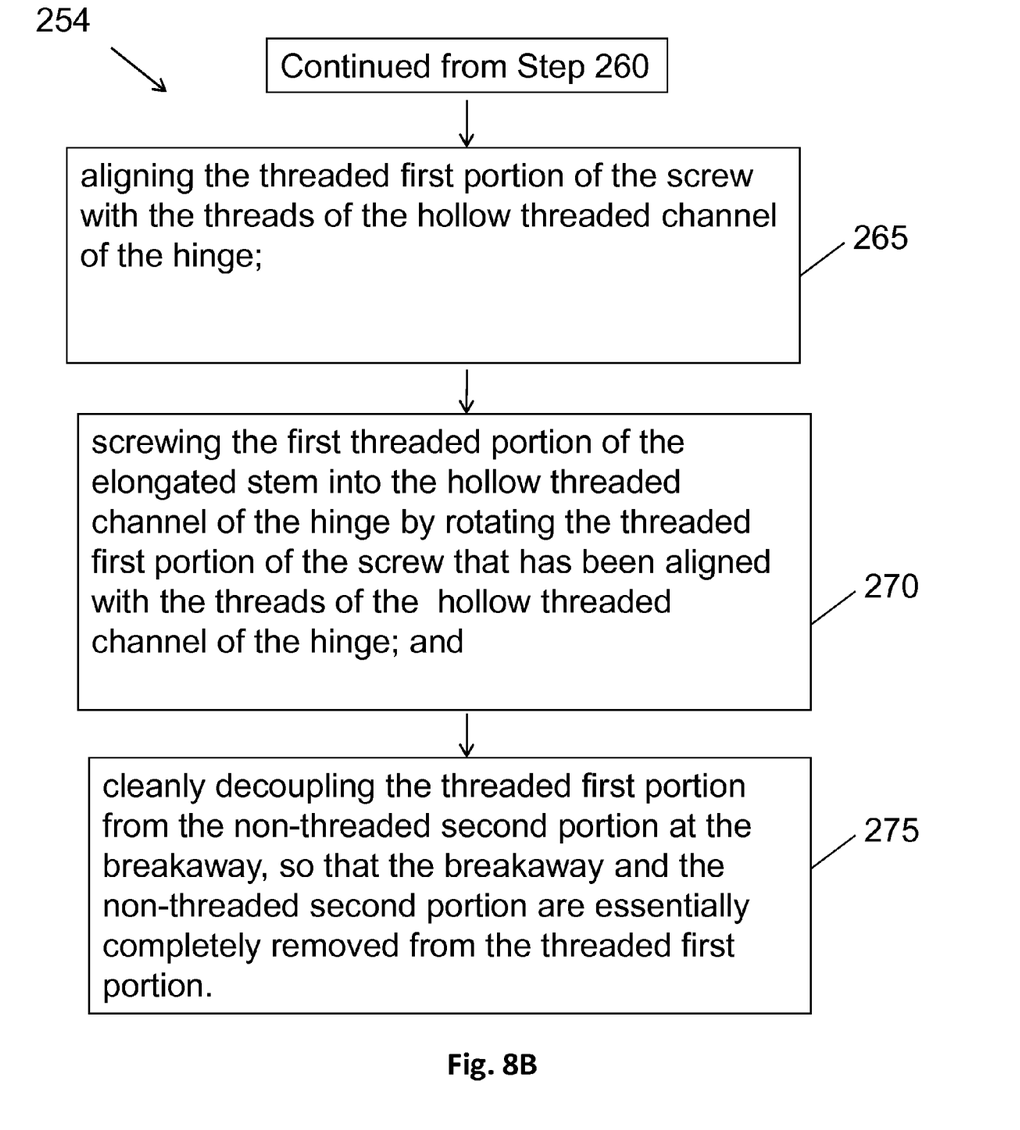

FIGS. 8A-8B depict a flow diagram of a method 254 for using the screw 10. In a step 255 of the method 254, the releasably coupled threaded first portion 20 of the elongated stem 11 the non-threaded second portion 30 of the elongated stem 11, and the breakaway 250, therebetween is provided. In a step, 260, the threads 215 of the threaded first portion 20 are screwed into a threaded channel 64 of a hinge 66 or screw hole 100 so that the threads 215 engage the threaded channel 64 of the hinge 66 by a user manipulating the insertion using the non-threaded second portion. In a step 265, the threaded first portion 20 of the screw 10 is aligned with the threads 63 of the hollow threaded channel 64 of the hinge 66 or screw hole 100. In a step 270, the threaded first portion 20 of the screw 10 is screwed into the hollow threaded channel 64 of the hinge 66 or screw hole 100 by rotating the threaded first portion 20 of the screw 10 that has been aligned with the threads 215 of the hollow threaded channel 64 of the hinge 66 or screw hole 100. In a step 275, the threaded first portion 20 of the elongated stem 11 the screw 10 is cleanly decoupled from the non-threaded second portion 30 of the elongated stem 11 at the breakaway 250, so that the breakaway 250 and the non-threaded second portion 30 of the elongated stem 11 are essentially completely removed from the threaded first portion 20 of the elongated stem 11 the screw 10.

In one embodiment, a clean break results from decoupling the threaded first portion 20 from the non-threaded second portion 30 at the breakaway 250, so that the breakaway 250 and the non-threaded second portion 30 are essentially completely removed from the threaded first portion 20 by the user applying a torsional or out-of-plane bending force by hand against the non-threaded second portion 30, without using a cutting tool or pliers or any device that would provide a mechanical advantage for the user.

In one embodiment, the clean break resulting from the user applying the torsional or out-of-plane 280, 285 bending force by hand against the non-threaded second portion 30, results in the sound of a "snap" or a "cracking" sound when the non-threaded second portion 30 and breakaway 250 are essentially completely removed from the distal end C of the threaded first portion 20 of the screw 10.

Example 1

For 1.8 mm diameter head:
Length of Threaded Portion: 3.0 mm, 3.8 mm, and 4.5 mm.
Length of the non-threaded portion; 10 MM
Diameter of breakaway: 0.55 MM/25.4 mm/in.=.0217 in.
Diameter of threaded portion: 1.2 mm (diameter of non-threaded portion is 0.8 mm), 1.3 mm, 1.4 mm, and 1.5 mm.
Diameter of non-threaded portion: 1.0 mm.

Example 2

2.0 mm head diameter:
Length of Threaded Portion: 3.0 mm, 3.8 mm, and 4.5 mm.
Length of the non-threaded portion; 10 MM
Diameter of breakaway: 0.55 MM
Diameter of threaded portion: 1.4 mm, and 1.5 mm.
Diameter of non-threaded portion: 1.0 mm.

Example 3

2.5 mm head:
Length of Threaded Portion: 3.2 mm, 4.0 mm, and 4.7 mm
Length of the non-threaded portion; 10 MM
Diameter of breakaway: 0.55 MM
Diameter of threaded portion: 1.4 mm, and 1.5 mm.
Diameter of non-threaded portion: 1.0 mm.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

I claim:

1. A screw, comprising:
    a screw head; and
    an elongated stem, comprising:
        a threaded first portion and a non-threaded second portion extending from the distal end of the threaded first portion and a breakaway therebetween,
            wherein a proximal end of the breakaway is co-extensive with a distal end of the threaded first portion and a distal end of the breakaway is co-extensive with a proximal end of the non-threaded second portion,
            wherein a diameter of the proximal end of the breakaway is less than a diameter of the distal end of the breakaway, so that the non-threaded second portion and the breakaway decouples cleanly from the threaded first portion when a user applies a torsional or out-of-plane bending force by hand sufficient to decouple the threaded first portion from the non-threaded second portion, without the use of a tool.

2. The screw of claim 1, wherein a ratio of the length of the threaded first portion to the non-threaded second portion is from about 1:3.33 to about 1:2.1, so that a user may apply a torsional or out-of-plane bending force by hand sufficient to decouple the threaded first portion from the non-threaded second portion at the breakaway.

3. The screw of claim 2, wherein a clean break results from decoupling the threaded first portion from the non-threaded second portion at the breakaway, so that the breakaway and the non-threaded second portion are essentially completely removed from the threaded first portion.

4. The screw of claim 1, wherein the diameter of the breakaway is less than or equal to 0.55 mm +/−25%.

5. The screw of claim 1, wherein a material of construction of the releasably coupled screw and extension is selected from the group consisting of plastic, metal, and metal alloys.

6. The screw of claim 5, wherein the plastic is selected from the group consisting of polyvinylchloride, high or low density polyethylene, high or low density polypropylene, polyetherimide, and EPDM (ethylene propylene diene terpolymer).

7. The screw of claim 5, wherein the metal is selected from the group consisting of nickel, brass, stainless steel and titanium.

8. A method of using a screw, comprising:
    providing the screw of claim 1;
    inserting the threaded portion of the screw so that it engages a threaded channel of a hinge by a user manipulating the insertion using the non-threaded second portion;
    aligning the threaded first portion of the screw with the threads of the hollow threaded channel of the hinge;
    screwing the first threaded portion of the elongated stem into the hollow threaded channel of the hinge by rotating the threaded first portion of the screw that has been aligned with the threads of the hollow threaded channel of the hinge; and
    cleanly decoupling the threaded first portion from the non-threaded second portion at the breakaway, so that the breakaway and the non-threaded second portion are essentially completely removed from the threaded first portion.

9. The method of using the screw of claim 8, wherein a clean break results from decoupling the threaded first portion from the non-threaded second portion at the breakaway, so that the breakaway and the non-threaded second portion are essentially completely removed from the threaded first portion by the user applying a torsional or out-of-plane bending force against the non-threaded second portion, without using a cutting tool or pliers or any device that would provide a mechanical advantage for the user.

10. The method of using the screw of claim 9, wherein the clean break resulting from the user applying the torsional or out-of-plane bending force against the non-threaded second portion, results in the sound of a "snap" or a "cracking" sound when the non-threaded second portion and breakaway are essentially completely removed from the distal end of the first portion of the screw.

* * * * *